(No Model.)

S. C. SHEPARD.
FRICTION CLUTCH.

No. 380,140. Patented Mar. 27, 1888.

WITNESSES.
Edwin I. Yewell.
Alex Mahon.

INVENTOR,
S. C. Shepard.
By
L. W. Ginsabaugh.
Attorney.

UNITED STATES PATENT OFFICE.

SYLVANDER C. SHEPARD, OF AKRON, OHIO, ASSIGNOR OF ONE-HALF TO E. D. CARR, OF SAME PLACE.

FRICTION-CLUTCH.

SPECIFICATION forming part of Letters Patent No. 380,140, dated March 27, 1888.

Application filed August 17, 1887. Serial No. 247,203. (No model.)

*To all whom it may concern:*

Be it known that I, SYLVANDER C. SHEPARD, a citizen of the United States of America, residing at Akron, in the county of Summit and State of Ohio, have invented certain new and useful Improvements in Friction-Clutches, of which the following is a specification, reference being had therein to the accompanying drawings.

My invention relates to that class of clutches in which the shaft or hub affixed thereto carries the locking dogs or pawls to engage a loosely-mounted rim, wheel, or gear when moving in one direction, and to be disengaged therefrom when moved in the opposite direction.

My invention consists in the combination of the pawls, pivoted to move in the arc of a circle of which their shafts are the center, with their outer faces made V-shaped and on a circle substantially concentric with the main shaft when in clutching or operating position, with the rim, disk, or gear operating in connection therewith.

It further consists in the combination of the pawl, having the pins or studs projecting from their side faces, with the carrying disk or hub, provided with curved slots provided with off-sets, through which the pins or studs pass for throwing and holding the pawls out of engagement with the rim, wheel, or gear.

Figure 2:
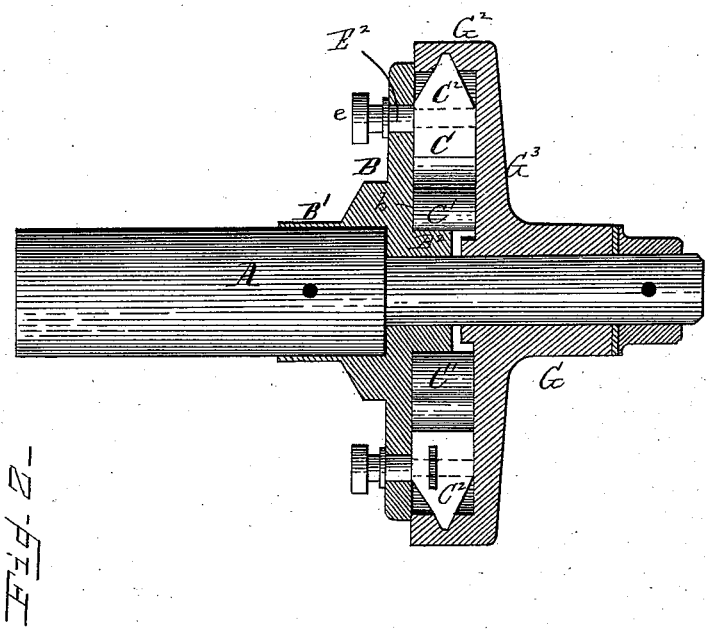
Figure 1:
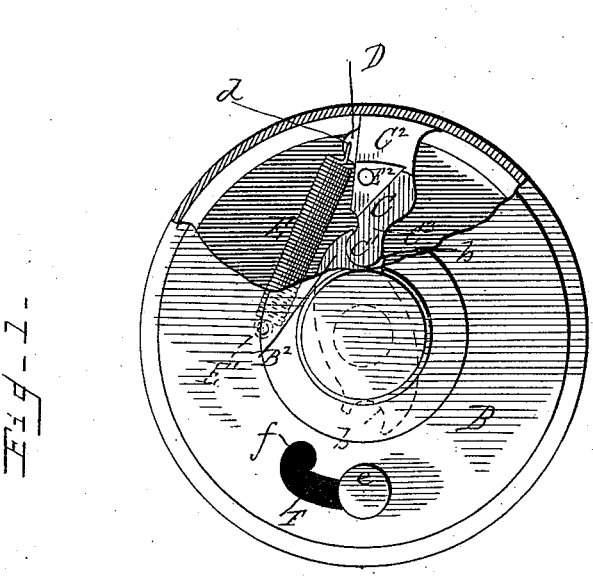

In the accompanying drawings, Figure 1 is a side view of the device with a portion of the outer inclosing-case and rim broken away, and Fig. 2 is a section of the device longitudinally of the shaft.

The axle or shaft A, which may be either the driving or driven shaft, is made preferably of smaller diameter at the outer end than the main portion, or at that portion where the clutch is mounted, as shown, and upon this shaft is mounted a disk, B, with a hub or collar, B', by which the same with the disk is rigidly secured to the shaft in any usual or preferred way. The opening in the hub for the passage of the axle or shaft is stepped to engage both the larger and the smaller portion of the shaft, as shown. From the inner face of the disk projects a hub, $B^2$, oblong in form, and in the extended side faces of which and upon opposite sides are formed recesses $b$, in U shape, forming the bearings for the pawls C, to permit the movement of the pawls therein.

The pawls C consist of the shaft portion C', in circular form to fit the recess $b$, and the head or gripping portion $C^2$, connected by a web, $C^3$. The end of the head portion $C^2$ is preferably made V-shaped to engage the groove, also preferably V-shaped in the inner face of the rim of the case, hereinafter referred to. The rear faces of the pawls have projecting from them lugs D, provided with suitable perforations, $d$, with which spiral springs E are connected, the other ends of said springs being connected by pins or projections E' with the inner face of the hub or disk, the pins being arranged in such relation to the pawls as to cause the springs to act thereon to draw said pawls into engagement with the outer rim of the case. The pawls have formed with them or otherwise secured thereto pins or studs $E^2$, having suitable heads, $e$, which pins or studs pass through and are adapted to move in slots F, formed in the rim or disk B. These slots are formed preferably in the arc of a circle of which the main shaft is the center, and at one end are offset, as shown at $f$, with which offset the pins or studs engage when it is desired to throw the pawls out of engagement with the rim.

The inclosing-case or driving or driven rim consists of a hub, G, and the disk portion $G^3$, with an inwardly-projecting rim or flange, $G^2$, the hub being perforated to fit the reduced portion of the main shaft, and when said case is in place upon the shaft to have the inner face of the rim abut against the disk B, and to form between said disks and rim an inclosing-case for the pawls and springs.

The rim or flange is provided on its inner face with a circumferential groove, as before stated, made preferably in V form, with which the outer faces of the pawls engage to clutch said parts together. The outer edges of the pawls are made in curved form, about in the arc of a circle of which the main shaft is the center, and said pawls are arranged at such angles that while they engage the rim with great force or frictional contact when moved against the rim in one direction, they will permit the rim to turn or move freely in the opposite direction, the pawls being held from being thrown too far back or out of the proper inclination by means of the web $C^3$ engaging the flat faces of the hub $B^2$ outside the recess $b$. A projecting toe or extension of the head or gripping portion gives each pawl a large gripping-surface and insures the proper engaging of the pawl to the rim. The inclosing-case may be either the driving or driven mechanism, and the outer rim may be provided on its outer face with spur or bevel gear for receiving or transmitting motion to a secondary shaft.

From the foregoing it will be seen that a large gripping-surface is provided with small parts, permitting the device to be brought into compact form, and that the parts are all inclosed, and, further, that the form of the pawl and groove serves to hold the parts together when in position upon the shaft.

The operation of the device is as follows: Motion being communicated either to the shaft or disk, the pawls engage the rim, and by frictional contact therewith cause the shaft and inclosing-case to move together, to communicate motion to a secondary or other shaft to which it is desired to communicate motion. When it is desired to throw the pawls out of engagement to allow the shaft to revolve without carrying the case, the pins or studs are moved in the slots into engagement with the offsets, which hold the pawls disengaged from the rim, in a manner that will be readily understood.

Having now described my invention, what I claim as new, and desire to secure by Letters Patent, is—

1. The slotted carrying-disk, the pawls supported in semicircular recesses therein to move in the arc of a circle of which their pivots are the center, and with their outer faces made V-shaped, said faces being on a circle substantially concentric with the main shaft when in clutching or operating position, and the pins projecting from the pawls to engage the slots in the disk, in combination with the inclosing-case provided with V-shaped grooves, substantially as described.

2. The combination of the carrying-disk provided with slots having offset ends, the pawls supported by said disks, the springs for connecting the pawls with the disk, the studs or pins, and the inclosing-case, substantially as described.

In testimony whereof I affix my signature in presence of two witnesses.

SYLVANDER C. SHEPARD.

Witnesses:
F. A. WILCOX,
A. H. NOAH.